Figure 1:
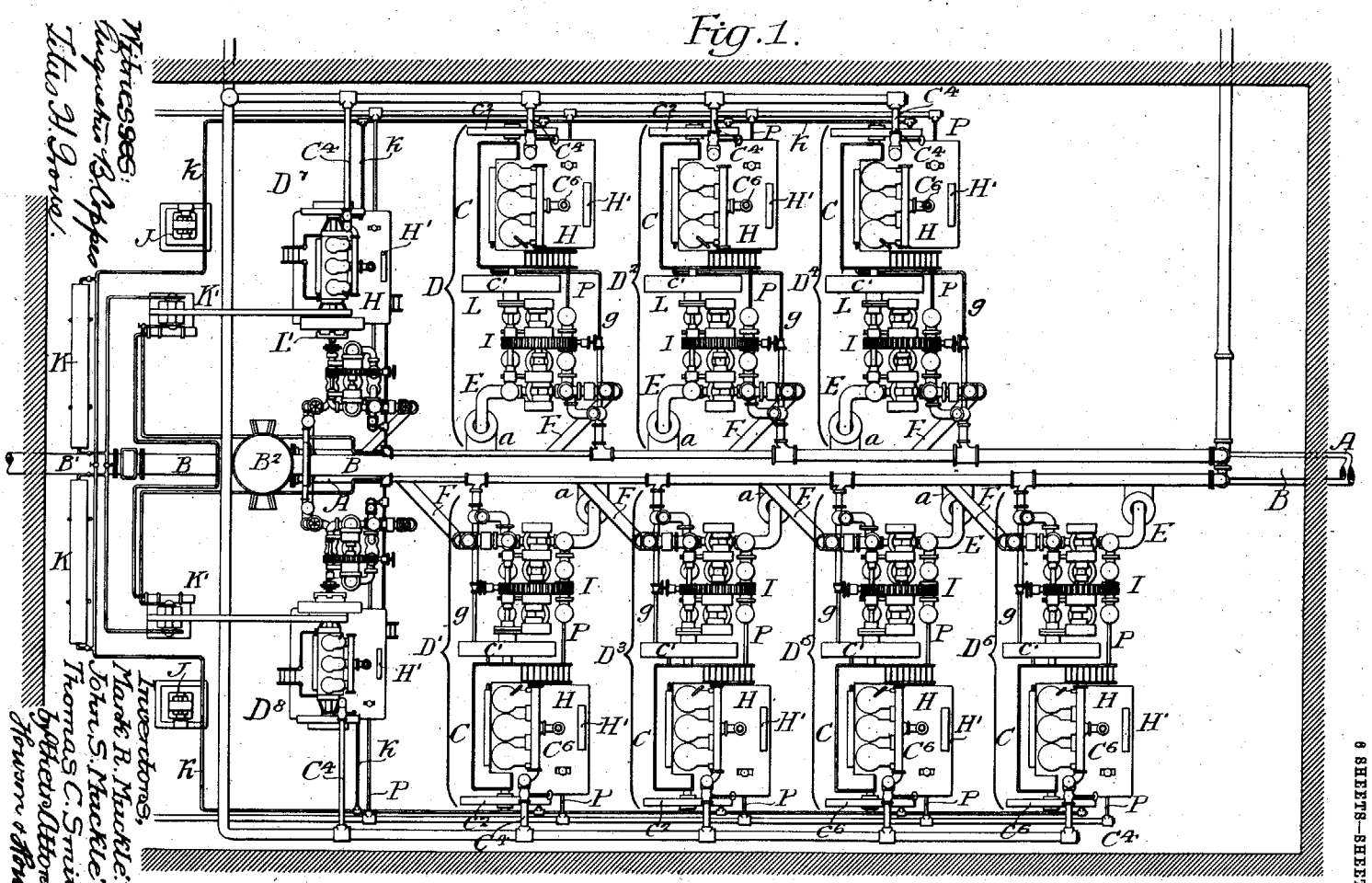

No. 12,547. REISSUED OCT. 23, 1906.

M. R. MUCKLÉ, JR., J. S. MUCKLÉ & T. C. SMITH.

PUMPING SYSTEM.

APPLICATION FILED SEPT. 15, 1906.

8 SHEETS—SHEET 1.

Witnesses:
Augustus B. Coppes
Titus H. Grove.

Inventors,
Mark R. Muckle Jr.
John S. Muckle.
Thomas C. Smith.
by their Attorneys
Howson & Howson No. 12,547. REISSUED OCT. 23, 1906.

M. R. MUCKLÉ, JR., J. S. MUCKLÉ & T. C. SMITH.

PUMPING SYSTEM.

APPLICATION FILED SEPT. 15, 1906.

6 SHEETS—SHEET 2.

Witnesses
Titus V. Gross.
Augustus B. Coppes

Inventors,
Mark R. Muckle, Jr.
John S. Muckle.
Thomas C. Smith.
by their Attorneys,
Howson & Howson No. 12,547. REISSUED OCT. 23, 1906.
M. R. MUCKLÉ, JR., J. S. MUCKLÉ & T. C. SMITH.
PUMPING SYSTEM.
APPLICATION FILED SEPT. 15, 1906.
6 SHEETS—SHEET 3.
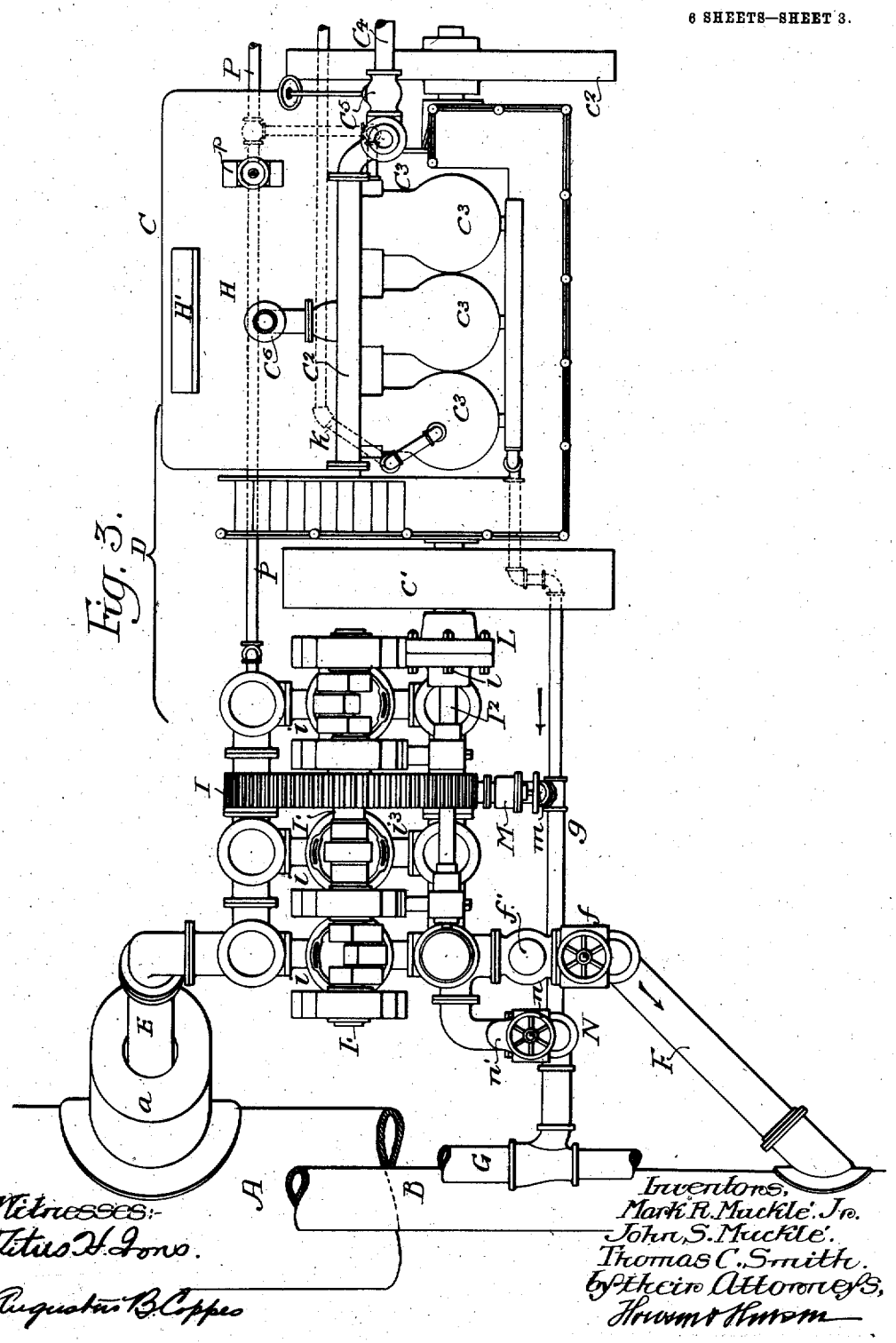

No. 12,547. REISSUED OCT. 23, 1906.
M. R. MUCKLÉ, JR., J. S. MUCKLÉ & T. C. SMITH.
PUMPING SYSTEM.
APPLICATION FILED SEPT. 15, 1906.
6 SHEETS—SHEET 4.
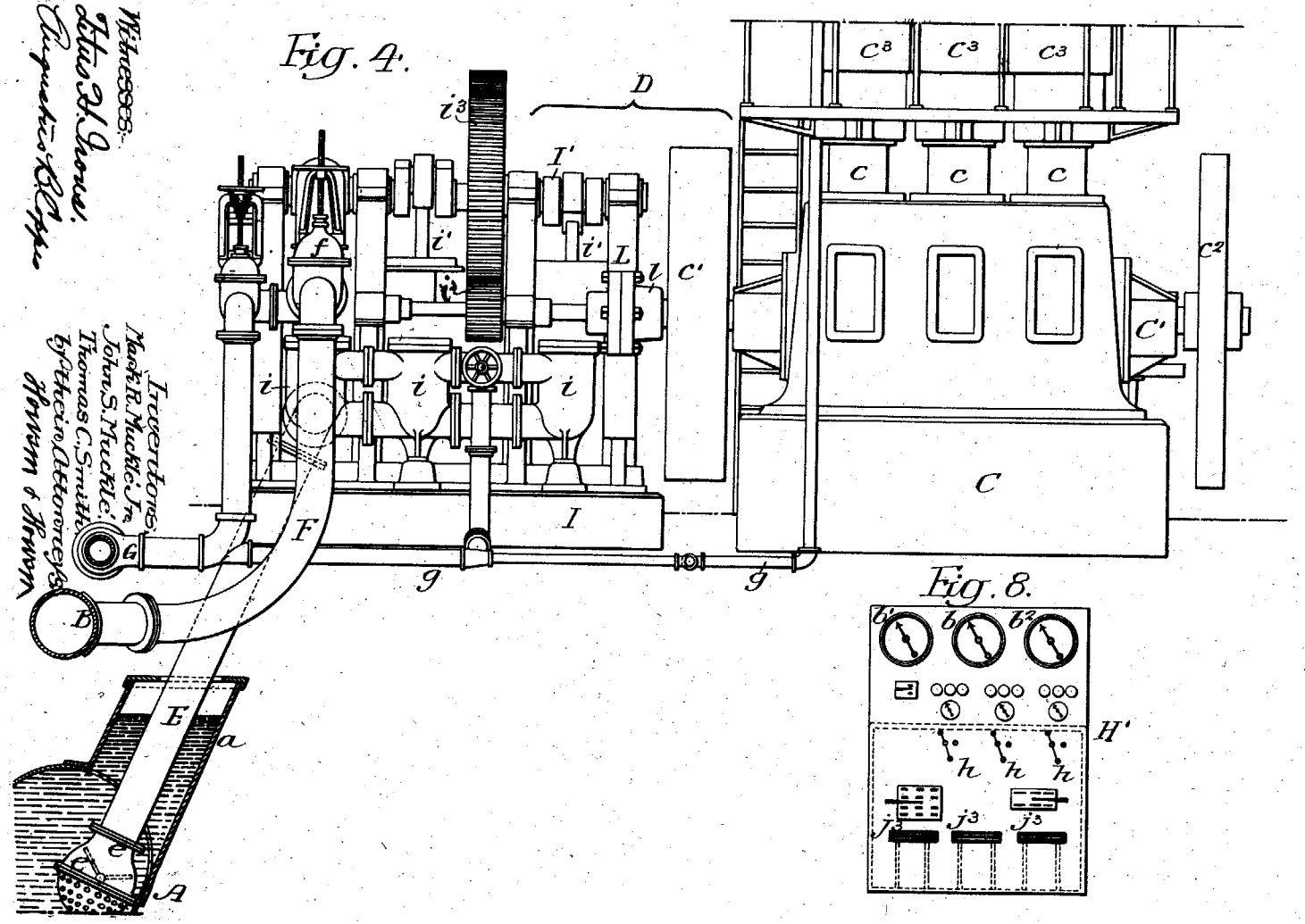

No. 12,547. REISSUED OCT. 23, 1906.
M. R. MUCKLÉ, JR., J. S. MUCKLÉ & T. C. SMITH.
PUMPING SYSTEM.
APPLICATION FILED SEPT. 15, 1906.
6 SHEETS—SHEET 5.
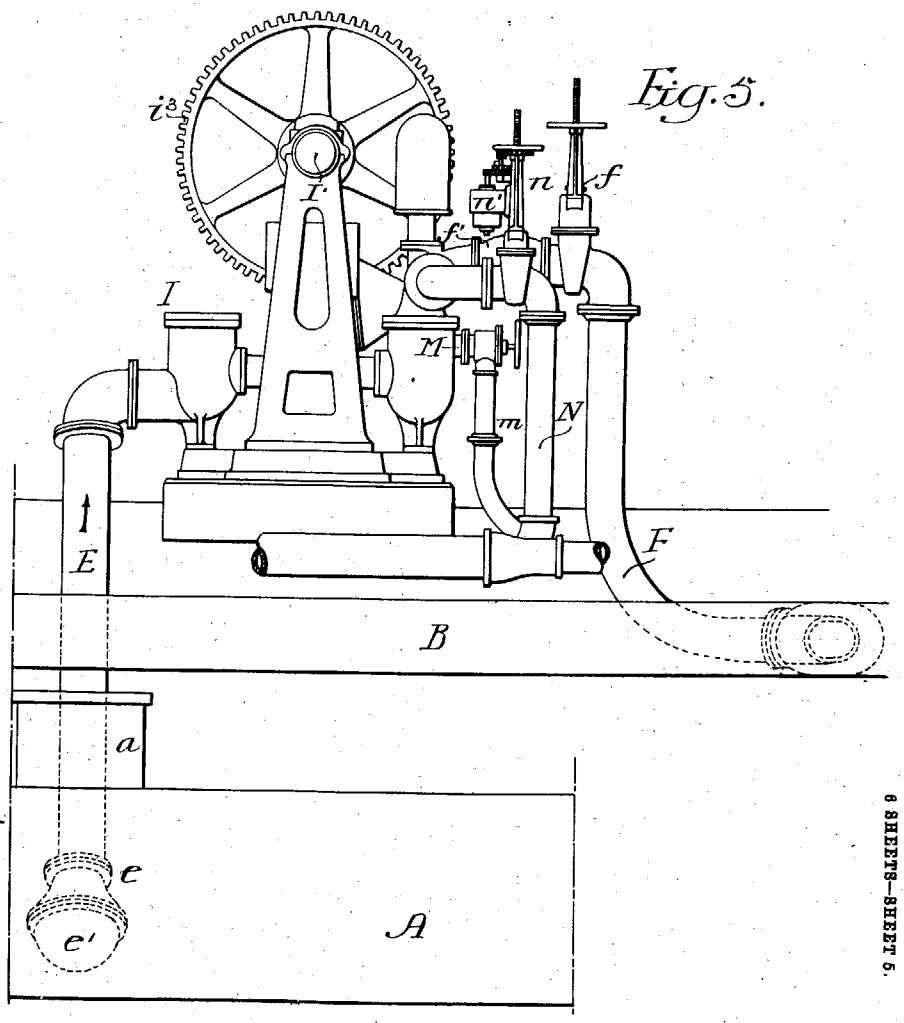
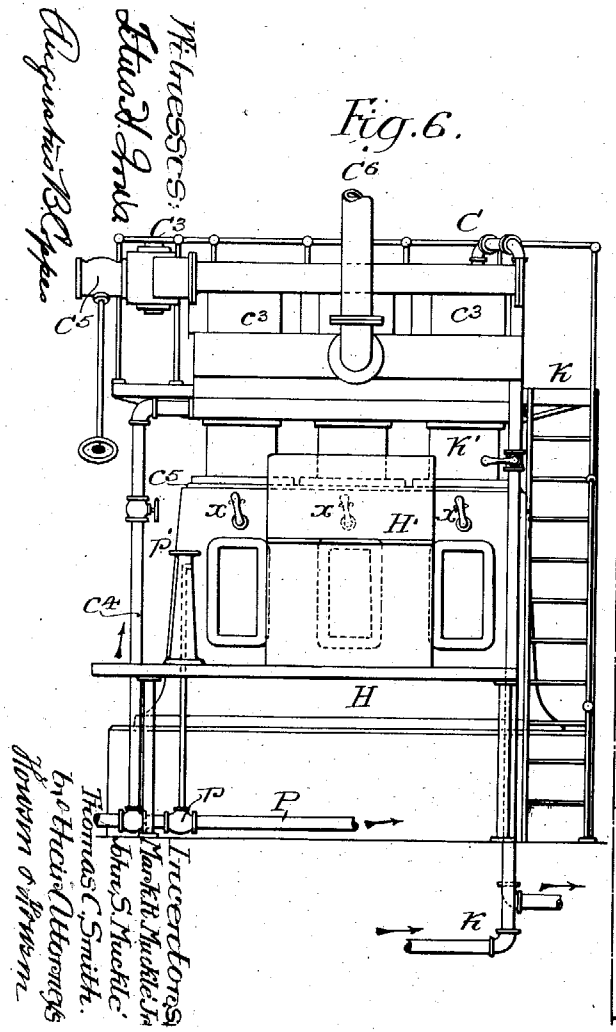

No. 12,547. REISSUED OCT. 23, 1906.

M. R. MUCKLÉ, JR., J. S. MUCKLÉ & T. C. SMITH.

PUMPING SYSTEM.

APPLICATION FILED SEPT. 15, 1906.

6 SHEETS—SHEET 6.

Witnesses:
William H. Rowe.
Titus H. Jones

Inventors,
Mark R. Muckle Jr.
John S. Muckle.
Thomas C. Smith.
by their Attorneys,
Howson & Howson

UNITED STATES PATENT OFFICE.

MARK R. MUCKLÉ, JR., JOHN S. MUCKLÉ, AND THOMAS C. SMITH, OF PHILADELPHIA, PENNSYLVANIA.

PUMPING SYSTEM.

No. 12,547. Specification of Reissued Letters Patent. Reissued Oct. 23, 1906.

Original No. 826,953, dated July 24, 1906. Application for reissue filed September 15, 1906. Serial No. 334,808.

*To all whom it may concern:*

Be it known that we, MARK R. MUCKLÉ, Jr., and JOHN S. MUCKLÉ, citizens of the United States, and THOMAS C. SMITH, a subject of the King of Great Britain and Ireland, residing in Philadelphia, Pennsylvania, have invented certain Improvements in Pumping Systems, of which the following is a specification.

Our invention relates to certain improvements in high-pressure fire-service stations. A high-pressure fire-service of this type consists of a main having any number of outlets and a stationary pump at some given point for placing water above normal pressure in the mains, so that this water can be used to extinguish fires with or without the aid of portable pumping-engines.

The main object of our invention is to utilize a series of gas-engine-driven pumps in such a manner that the pumps of the series may be thrown into action one at a time.

A further object is to so arrange the controlling mechanism that the engineer can pass from one engine to another and yet have complete control of the system, this object being attained by having individual operating mechanism and indicators at each engine, so that when an alarm is given the operator can throw in one engine to pump a certain amount of water and the other engines can be thrown in one at a time as the indicators show the need for more water. This condition will depend upon the extent of the fire and the number of nozzles open.

A still further object of our invention is to couple the gas-engine positively to the pump, dispensing entirely with the usual clutch heretofore used in coupling a gas-engine to a machine to be driven by said engine.

Figure 2:
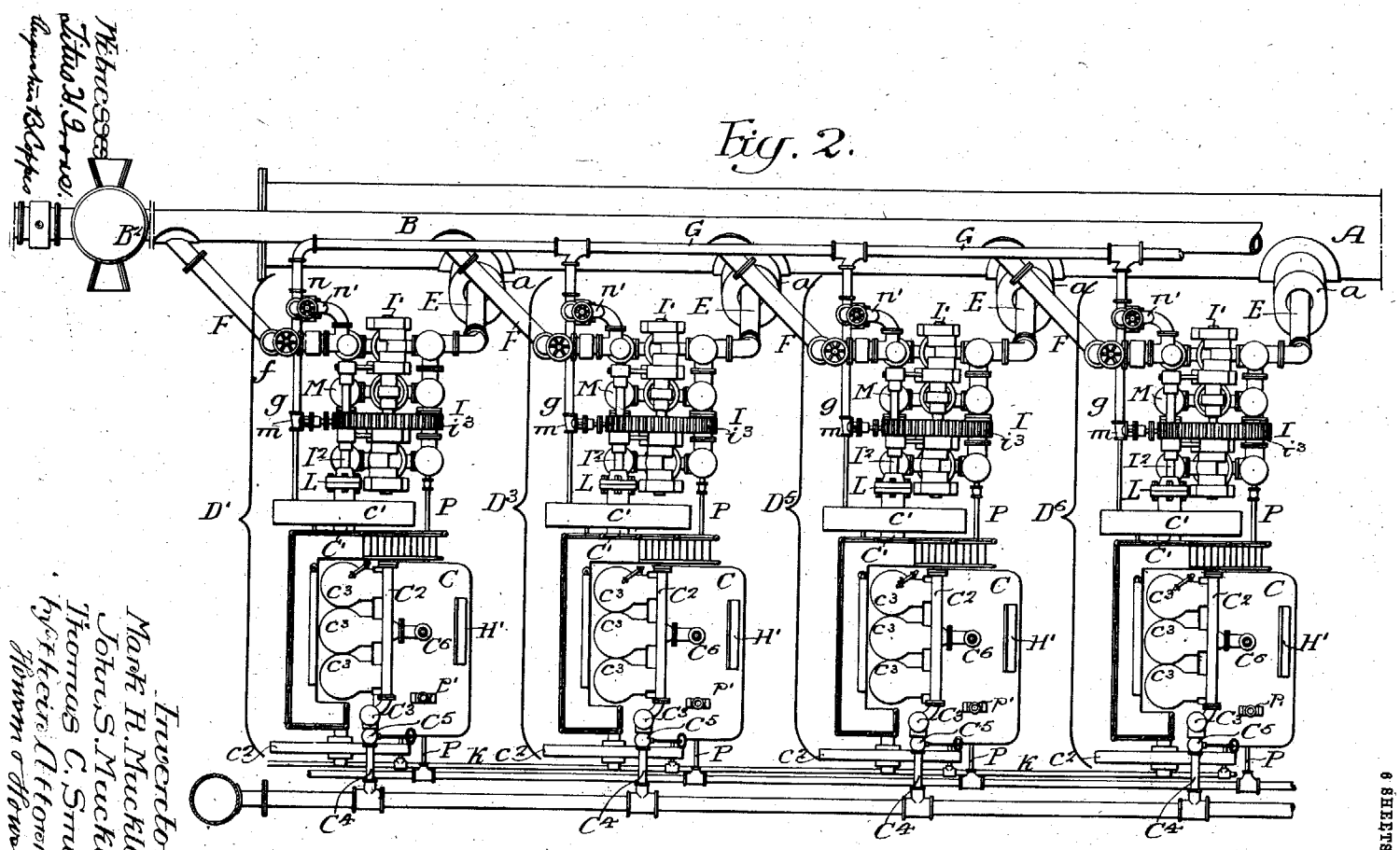
Figure 7:
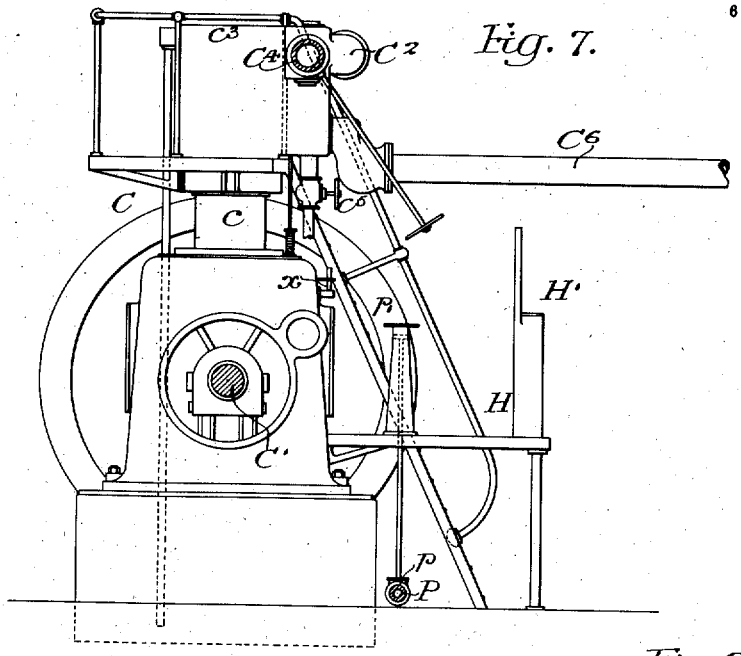
Figure 9:
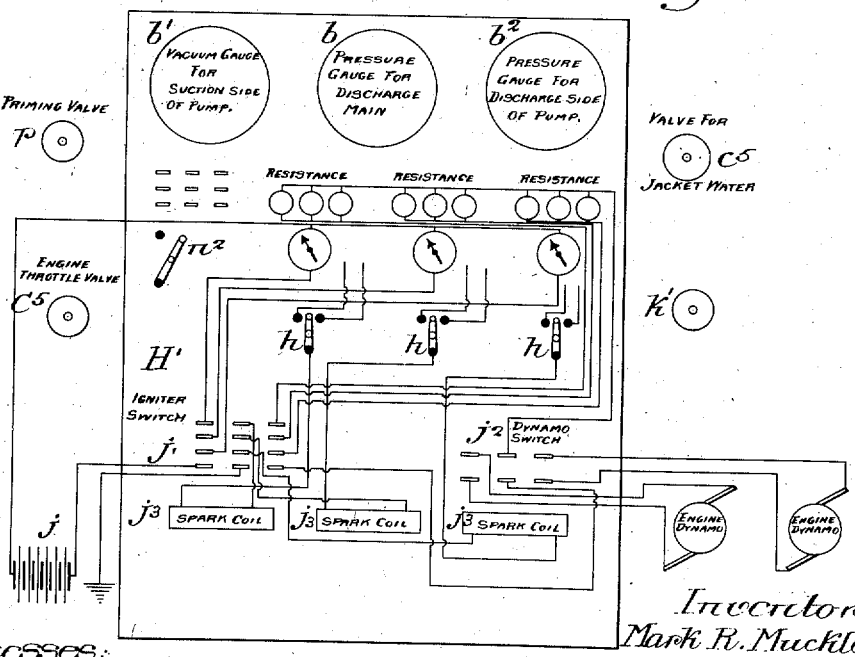

In the accompanying drawings, Figure 1 is a plan view in diagram, showing a complete high-pressure fire-service station, illustrating our invention. Fig. 2 is a plan view showing a series of four pumping-engines coupled to a fire-main. Fig. 3 is an enlarged view of a single unit of the plant. Fig. 4 is a side elevation of the pump shown in Fig. 3. Fig. 5 is an end view of one of the pumps. Fig. 6 is a side view of one of the gas-engines opposite to that shown in Fig. 4, showing the operating-platform. Fig. 7 is an end view of a gas-engine unit. Fig. 8 is a view of the switch and gage board which is situated on the controlling-platform, and Fig. 9 is a diagram view illustrating the arrangement of the controlling mechanism of each pump unit.

The discharge-main of a high-pressure fire-service makes a circuit from a power-house through a section of a city, having branch pipes extending to fire-hydrants at different points. This main is supplied with water from any suitable source, preferably under city pressure, and our improved pumping plant is only coupled to this discharge-main when an alarm of fire is given. This particular feature forms no part of our invention.

In the accompanying drawings we have shown a plant in which there are seven main pumping-engines and two auxiliary pumping-engines. The engines of the auxiliary pumps in addition to their usual work may be used for driving air-compressors or for driving dynamos or for any other work around the plant.

The pumping mechanism is installed within a building preferably in close proximity to a river or reservoir from which an abundant supply of water can be drawn, as the pumps must force great quantities of water through extended mains and at such a pressure as to carry the stream at the nozzle to a great height without the use in many cases of an auxiliary pumping-engine at the fire-hydrants.

Referring now to the drawings, A is a suction-conduit extending from the source of water-supply into the building in which the pumping-engines are installed.

B is a discharge-main coupled to the discharge-pipe of each pump and to the street-main B′, extending to the several hydrants within a certain district, and $B^2$ is the air-chamber of the discharge-main, which can be of any size desired.

The main A in the present instance extends to a river in which the tide rises and falls, and this main is provided with extensions or sumps *a* at each pump into which the suction-pipes of said pumps extend. The extension is closed by a loose cover, and the water can rise and fall in the extension without uncovering the end of the suction-pipe.

D to $D^6$, inclusive, represent independent pumping-engine units each having a suction-pipe E extending into the main A, as described and clearly shown in Fig. 4, so that each pumping unit will receive water independently from the main A, and each pump has a discharge-pipe F coupled to the discharge-main B.

Each pumping-engine unit consists of a gas-engine C and a pump I. In the present instance the gas-engines employed are of the three-cylinder four-cycle type, the gas being ignited by a spark and the connecting-rods being coupled directly to the crank-shaft C′, which in the present instance is provided with fly-wheels $c'$ $c^2$. The cylinders $c$ are each inclosed in a water-jacket $c^3$, supplied with water from a pipe $c^4$, provided with a suitable valve $c^5$ within easy reach of the operator when on any one of the controlling-platforms H, which are located at one side of each engine. The exhaust-pipe $g$ leads from the jacket $c^3$ to the outlet or waste pipe G, which may be connected to the suction-conduit A or to a reservoir or may be allowed to pass to waste through a separate conduit.

$C^2$ represents the admission-pipes for the products of combustion.

$C^3$ is the mixing-chamber for the gas and air, gas being admitted to the chamber through the pipe $C^4$, having a suitable throttle-valve $C^5$, the stem of which extends to a point within reach of the operator when on the platform H.

$C^6$ is the exhaust-pipe communicating with the exhaust-passages leading from the several cylinders $c$.

The gas-engines in the present instance are started by means of compressed air admitted to one of the cylinders of each unit through a pipe $k$, having a valve $k'$ within reach of the operator when on the platform H. The pipes $k$ lead from the air-cylinders K at one end of the building to each gas-engine unit. The air is forced under high pressure into the compressed-air cylinders by air-compressors K′, two in the present instance, driven from two auxiliary gas-engines $D^7$ $D^8$ of less capacity than the engines D to $D^6$, inclusive; but other means of compressing air may be used without departing from our invention.

Each gas-engine has suitable regulating and governing devices to make it operate at a constant speed whether the pump is loaded or light.

In the present instance an electric igniter is used for each cylinder of the engines. The igniters are controlled by switches $hhh$ on the switchboard H′, mounted on the platform H.

In order to insure the proper working of the sparking mechanism, we have so designed the apparatus that a primary or storage battery $j$ can be used or the current can be taken from a dynamo J driven from one of the auxiliary gas-engines, or the current may be taken from an outside source of supply, thus insuring an uninterrupted current.

Cam-operating levers, one for each cylinder of each engine, are indicated at $x$. The levers are so arranged that the gas inlet and outlet cams can be thrown out when the engine is started by the use of compressed air.

We have shown two dynamos J J, Fig. 1, driven from the gas-engine $D^7$ $D^8$, respectively, and these dynamos can be used to generate the electric-lighting current for the building and for power, if desired.

Referring to the diagram of the switchboard, Fig. 9, $j'$ is the igniter-switch, $j^2$ is the dynamo-switch, while the spark-coils in the several circuits are indicated at $j^3$.

In the present instance the pumps have three cylinders $i$ and are double-acting, having piston-rods $i'$ connected to a crank-shaft I′, which is driven from a power-shaft $I^2$ through a pinion $i^2$ and gear-wheel $i^3$.

An important feature of our invention is that the crank-shaft C′ of each main gas-engine C is coupled directly in a rigid manner to the driving-shaft $I^2$ of the pump, clutches being dispensed with entirely. The coupling L in the present instance is made in halves, one-half being rigidly secured to the driving-shaft $I^2$ of the pump, the other half being rigidly secured to the crank-shaft C′ and the two halves being secured together by bolts $l$. When the engine is set in motion by admitting compressed air to one of the cylinders, the pump is also set in motion, there being no lost motion between the engine and the pump.

The gas-engines of the auxiliary pumps $D^7$ and $D^8$ are preferably coupled to the pumping mechanism by clutches L′ in the ordinary manner, so that these engines can be run independently of their pumps when it is desired to operate the compressors K′ or the dynamos J. One or both of the auxiliary pumps $D^7$ and $D^8$ can be used to keep a low pressure at all times in the main or to supplement the main pumping-engines when more water is required than the main pumps can supply.

Each pump unit I has an independent suction-pipe E extending into the extensions or sump $a$ of the conduit A, and this pipe E has a foot-valve $e$ and screen $e'$. The valve $e$ is the only valve between the sump and the pump-cylinders.

F is the discharge-pipe leading from the pump to the discharge-main B, and in this pipe is a valve $f$, which in the present instance is operated by hand. Between the valve $f$ and the pump is a check-valve $f'$, which opens toward the main.

N is the overflow-pipe forming a communication between the pump and the waste-pipe G, which acts as a by-pass when the pump is first set in motion, as it will be understood that the pump does not immediately pump water into the main B, but pumps it through the overflow-pipe into the suction-conduit or to waste. The overflow-pipe is provided with a gate-valve $n$, which in the present instance is operated by an electric motor $n'$, the armature-shaft of the motor being geared to a wheel on the valve-stem, as clearly shown in the drawings. The motor $n'$ of each pumping unit is controlled by a switch $n^2$ on the switchboard H'.

Each pumping unit has a relief-valve M, which communicates with the waste-pipe G through a pipe $m$ and the pipe $g$. This relief-valve acts as a safety-valve to prevent more than a given pressure being put on the water in the pump, so that when the pump has reached a given pressure the valve will automatically operate and the excess water will flow through the relief-pipe.

P is a priming-water-supply pipe leading to the cylinders of each pumping unit and has a priming-valve $p$, provided with a stem, and hand-wheel $p'$, mounted on the platform H within reach of the operator. The pipe $c^4$, leading to the water-jackets of the engine-cylinder, is preferably coupled to this pipe P, as shown in Fig. 6.

For the quick operation of each pumping unit and with the object in view of using the minimum amount of labor—*i. e.*, that of one man—we locate operating-platforms H at points near each engine, as shown in the drawings. From these platforms the entire operation of each pumping unit is controlled. On each platform is mounted the switchboard H' and a cabinet containing all the necessary switches, gages, and appurtenances, the valves being mounted so as to be within easy reach of the operator, as described above. On each switchboard, $b$ indicates a pressure-gage connected with the discharge-main B; $b'$, a vacuum-gage connected with the suction side of the pump, and $b^2$ a pressure-gage connected with the discharge side of the pump. It will be readily seen, therefore, that from the platforms H every operation necessary to the starting, stopping, and control of the pumping units can be accomplished and by one operative.

By using gas-engines as a means of driving the pumps the pumping plant can immediately respond to an alarm of fire, the operator going to the first pumping unit and mounting the platform H, where he is in position to control the entire unit. After starting the engine he can see at a glance the pressure upon the main B. As soon as the first engine is set in motion he leaves it and immediately goes to the platform of the second pumping unit, throwing this second engine into action, with the exception that instead of forcing water through the main he allows the water to by-pass through the overflow-pipe, and he does not couple this second pump to the main B until the main-gage $b$ shows that additional water is needed. As soon as this is done he leaves the second pumping unit and goes to the third pumping unit, placing it in operation, by-passing as described above, and so on throughout the series, according to the extent of the fire and number of hydrants open. If he finds that the fire is under control and that a certain number of hydrants have been cut off, then he commences to reduce the water-supply by first cutting down one engine, allowing it to by-pass until the pressure indicates that he can cut this down entirely. Then he goes to another engine and cuts it down in a similar manner until he finds that the fire has been extinguished and the fire-engines (if used) uncoupled and the hydrants all closed. Then he can cut down the entire plant. In the event of a large fire and it is wished to wash down the ruins the operator can either use one of the large pumps or one of the smaller auxiliary pumps, which can be run for some time economically, according to the size of the fire. It will thus be seen that any number of gas-engines controlling the operation of the pumping units can be thrown into action one after the other, and each engine is under the complete control of the operator while he is at the engine. When he leaves one engine to attend to another one of the series, the previously-started engine is working under full pressure and need not be disturbed until he returns to cut down the supply.

We claim—

1. The combination in a pumping system, of two or more pumps, a gas-engine for each pump whereby each pump can be independently operated, an inlet for each pump, an outlet common to all the pumps, a by-pass for each pump so that one pump can be started at a time, each pump by-passing the water until it is desired to communicate with the outlet-main, substantially as described.

2. The combination in a pumping system, of a series of pumping units, each unit consisting of a pump and a gas-engine for driving the pump, each pump having an inlet for water and an outlet for water, and a by-pass, the outlets of the several pumps communicating with the main leading from the pumping system, substantially as described.

3. The combination in a pumping system, of a series of like units, each unit consisting of a pump, a gas-engine directly connected to the pump, means for supplying gas to the engine, and means for supplying compressed air to the cylinders of the engine, an inlet and an outlet for the pump, a by-pass for each pump, and a valve at each pump, with a distributing-main common to all the pumps so that on opening the valves in the outlet-pipe of each pump the pumps will be connected directly to the main, substantially as described.

4. The combination in a pumping system, of a series of pump units, each unit consisting of a pump, a gas-engine by which the pump is driven, gas-admission pipes and compressed-air-admission pipes for the said gas-engine, an inlet and an outlet for the said pump, a by-pass so that each pump can pump to waste, valves for regulating the flow of water through the by-pass, valves for regulating the flow of water from each pump, a distributing-main connected to the outlet-pipe of each pump, and means at each unit for controlling the gas-engine and pumping mechanism and for recording the pressure in the distributing-main, substantially as described.

In testimony whereof we have signed our names to this specification in the presence of two subscribing witnesses.

MARK R. MUCKLÉ, JR.
JOHN S. MUCKLÉ.
THOMAS C. SMITH.

Witnesses:
WILL. A. BARR,
JOS. H. KLEIN.